L. M. LINBLOM.
SUPER FOR BEEHIVES.
APPLICATION FILED DEC. 2, 1910.

995,070.

Patented June 13, 1911.

Witnesses:
A. R. Walton
M. R. Wilson

Inventor
Lars M. Linblom
by Wilson R. Stevens
Attys

UNITED STATES PATENT OFFICE.

LARS M. LINBLOM, OF SIOUX CITY, IOWA.

SUPER FOR BEEHIVES.

995,070.

Specification of Letters Patent. Patented June 13, 1911.

Application filed December 2, 1910. Serial No. 595,272.

*To all whom it may concern:*

Be it known that I, LARS M. LINBLOM, citizen of the United States, residing at Sioux City, in the county of Woodbury and State of Iowa, have invented certain new and useful Improvements in Supers for Beehives, of which the following is a specification.

This invention has for its object to provide a super for beehives having detachable sides to facilitate the removal of honey, and also to enable all parts of the structure to be thoroughly cleaned after the honey has been removed; and to this end the invention consists in a novel construction and arrangement of parts to be hereinafter described and claimed.

Figure 1:
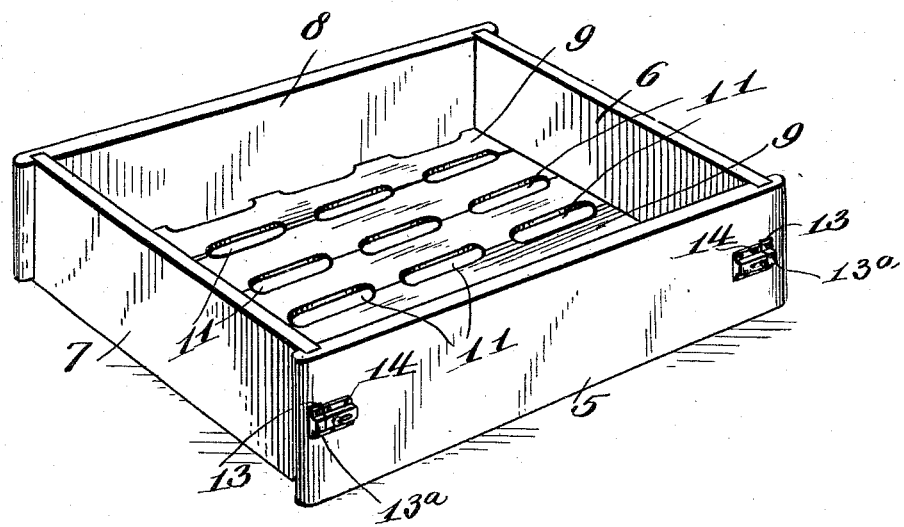
Figure 2:
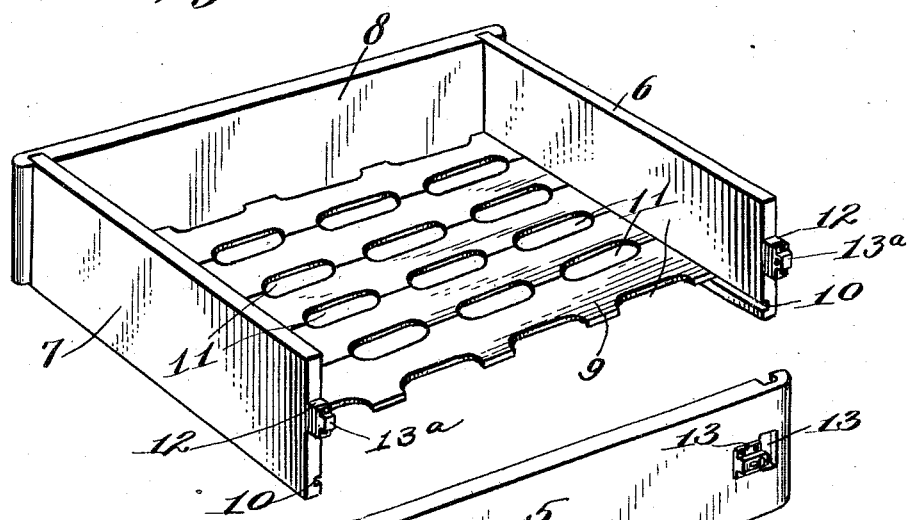

In the accompanying drawing—Figure 1 is a perspective view of a super constructed in accordance with the present invention. Fig. 2 is a perspective view of the super with one of the walls and a portion of the bottom slats removed.

Referring specifically to the drawing, the super is a box-like structure of rectangular form, as usual, the four walls of which are indicated at 5, 6, 7 and 8, respectively, 5 and 8 being the front and rear walls, respectively, and 6 and 7 the side walls. The bottom of the super is composed of slats 9 which seat at their ends in grooves 10 made in the inner face of the side walls, near the bottom thereof. These slats support the comb frames (not shown), each slat supporting a row of such frames. The longitudinal edges of the slats are cut away at intervals to form openings 11 in the bottom of the super to permit ingress and egress of the bees. The front wall 5 is removable, and the slats 11 are slidably mounted in the grooves 10 so that one slat after the other, with the comb frames thereon, may be removed, which can be readily done without breaking the combs.

The front edges of the side walls 6 and 7 are formed with tenons 12 which pass through openings 13 in the wall 5, the tenons projecting from said wall, and carrying sockets 13ª on their projecting ends which are entered by sliding bolts 14 mounted on the outside of the front wall, adjacent to the openings 13, whereby said wall is securely held in position. To remove said wall it is necessary only to slip the bolts out of the sockets, after which the wall can be detached. This leaves the front of the super entirely open, and the slats 11 and the comb frames carried thereby may then be taken out as already described. Inasmuch as the slats and the front wall of the super are removable, said parts, as well as the remainder of the super, can be thoroughly cleaned. The front wall can be readily attached or detached, and the structure is devoid of complicated parts, and can be cheaply and easily manufactured.

I claim:

A super for beehives comprising a rectangular box-like structure having three of its walls rigidly connected, and one of its walls supported by the adjacent walls and bodily removable therefrom, and a bottom which is slidably supported by said adjacent walls of the removable wall, said bottom being removable from its supporting walls when the removable wall is detached from the adjacent walls.

In testimony whereof I affix my signature in presence of two witnesses.

LARS M. LINBLOM.

Witnesses:
P. F. SWINEHART,
J. W. HUBBARD.

Copies of this patent may be obtained for five cents each, by addressing the "Commissioner of Patents, Washington, D. C."